(12) United States Patent
Kruglick

(10) Patent No.: US 9,563,620 B2
(45) Date of Patent: Feb. 7, 2017

(54) AUTOMATIC AGGREGATION FOR INFRASTRUCTURE STRING MATCHING

(71) Applicant: Empire Technology Development LLC, Wilmington, DE (US)

(72) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 251 days.

(21) Appl. No.: 14/293,363

(22) Filed: Jun. 2, 2014

(65) Prior Publication Data

US 2015/0347386 A1 Dec. 3, 2015

(51) Int. Cl.
*G06F 17/30* (2006.01)
*G06F 17/27* (2006.01)

(52) U.S. Cl.
CPC ..... *G06F 17/2735* (2013.01); *G06F 17/30563* (2013.01); *G06F 17/30985* (2013.01)

(58) Field of Classification Search
CPC combination set(s) only.
See application file for complete search history.

(56) References Cited

U.S. PATENT DOCUMENTS

| 7,356,663 | B2 | 4/2008 | Jain |
| 8,504,488 | B2 | 8/2013 | Dutta et al. |
| 2004/0083091 | A1* | 4/2004 | Ie .......................... G06F 17/277 704/9 |
| 2008/0065639 | A1* | 3/2008 | Choudhary ............... G06F 7/02 |
| 2008/0263026 | A1* | 10/2008 | Sasturkar ............ G06F 17/2211 |
| 2012/0030438 | A1* | 2/2012 | Shafai ..................... G06F 12/00 711/159 |

OTHER PUBLICATIONS

"Network processor," accessed at http://web.archive.org/web/20130603200923/http://en.wikipedia.org/wiki/Network_processor, accessed on May 26, 2014, pp. 5.
"StreamReduce/streamreduce-core," accessed at https://github.com/StreamReduce/streamreduce-core, accessed on May 26, 2014, pp. 4.
"String searching using Aho-Corasick," accessed at http://web.archive.org/web/20131231005318/http://papercruncher.com/2012/02/26/string-searching-using-aho-corasick/, accessed on May 26, 2014, pp. 3.
Alfred V.A., and Margaret, J.C., "Efficient String Matching: An Aid to Bibliographic Search," Communications of the ACM, vol. 18, No. 6 pp. 333-340 (1975).
Boyer, R. and Moore, J. "A fast string searching algorithm," CACM, vol. 20, No. 10, pp. 762-772 (1977).
Dharmapurikar, S. and Lockwood, J., "Fast and Scalable Pattern Matching for Content Filtering." In Architecture for Networking and Communications Systems, pp. 183-192, (2005).
Kessler, R., "Cavium 32 Core Octeon II CN68xx," Hot Chips, pp. 1-33 (Aug. 23, 2011).

(Continued)

*Primary Examiner* — Etienne Leroux
(74) *Attorney, Agent, or Firm* — Brundidge & Stanger, P.C.

(57) ABSTRACT

In some examples, a computing system may receive a plurality of string matching requests with respect to a plurality of data streams, and determine one or more opportunities for aggregation of string matching.

17 Claims, 7 Drawing Sheets

(56) References Cited

OTHER PUBLICATIONS

Lin, W. and Liu, B., "Pipelined Parallel AC-based Approach for Multi-String Matching," 14th IEEE International Conference on Parallel and Distributed Systems, pp. 665-672 (2008).
Marz, N. "Storm: Distributed and fault-tolerant realtime computation," accessed on May 26, 2014, pp. 99.
Miniman, S., "SDN, OpenFlow and OpenStack Quantum," accessed at http://web.archive.org/web/20140329231902/http://wikibon.org/wiki/v/SDN,_OpenFlow_and_OpenStack_Quantum, accessed on May 26, 2014, pp. 5.
Mouza, C.D. et al., "On-line Aggregation and Filtering of Pattern-based Queries," 18th International Conference on Scientific and Statistical Database Management, pp. 333-342 (2006).
Wiseman, C. et al., "A remotely accessible network processor-based router for network experimentation," in Proceedings of the 4th ACM/IEEE Symposium on Architectures for Networking and Communications Systems, pp. 20-29 (2008).
Xinyan, Z. and Sahni, S., "Multipattern String Matching on a GPU." In 2011 IEEE Symposium on Computers and Communications (ISCC), pp. 277-282 (2011).

* cited by examiner

AUTOMATIC AGGREGATION FOR INFRASTRUCTURE STRING MATCHING

TECHNICAL FIELD

Technologies described herein pertain generally to string matching and, more particularly, to aggregation of string matching with respect to multiple data streams.

BACKGROUND

Unless otherwise indicated herein, the approaches described in this section are not prior art to the claims in this application and are not admitted to be prior art by inclusion in this section.

Data centers see business opportunities in offering an entire spectrum of services from virtualized basic hardware to turnkey task accomplishments. In particular, any task that scales better for the data center operator than it does for users renting virtual machines is a candidate for data centers to offer as a turnkey service. As an example, video transcoding is being offered by a data center operator as a turnkey service because it is difficult for users to run efficient video transcoding on arbitrary virtual machines.

String matching is another function by which data centers may scale better than individual users. Multipattern string matching is a general purpose function in which a processing module reports occurrences of a given set or dictionary string in a stream of data. Multipattern string matching arises in a number of applications including network intrusion detection, digital forensics, business analytics, and natural language processing. In one example, calculating the "reach" of a social media post involves recognizing and pulling all URLs out of a stream of data or detecting URLs that have various properties, and then processing the specific posts to extract unique subscriber counts and the like. Similarly, many consumer companies pay for access to feeds of various content posting streams in order to search for indications of feelings towards their products to either deal with discontent or promulgate positive crowd stories.

Realizing the value of multipattern search across multiple users has a number of challenges, however. To realize such advantages a data center will need to find and unify similar search streams, and then manage search and report ownership.

SUMMARY

In one example embodiment, a method may include one or more processors receiving a plurality of string matching requests with respect to a plurality of data streams, and determining one or more opportunities for aggregation of string matching.

In another example embodiment, a computer-readable storage medium having stored thereon computer-executable instructions executable by one or more processors to perform operations that include: identifying similarity in a subset of requests of a plurality of string matching requests with respect to one or more data streams; and aggregating string matching for the subset of requests of the plurality of string matching requests.

In yet another example embodiment, an apparatus may include an aggregation determination module that includes a plurality of string matching units, a stream registry unit, a stream characterization unit, and a stream provider portal unit. The string matching units are configured to receive a plurality of string matching requests with respect to a plurality of data streams, perform string matching related to the plurality of data streams in response to the receiving, and compose a combined dictionary from a plurality of dictionaries each of which including a respective plurality of strings. The stream registry unit is configured to register an identity of a first data stream of the plurality of data streams, and generate a first output. The stream characterization unit is configured to extract information from the first data stream, and generate a second output. The stream provider portal unit is configured to receive indication from one or more data providers that duplicate streams of data are provided to the one or more data providers, and generate a third output.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
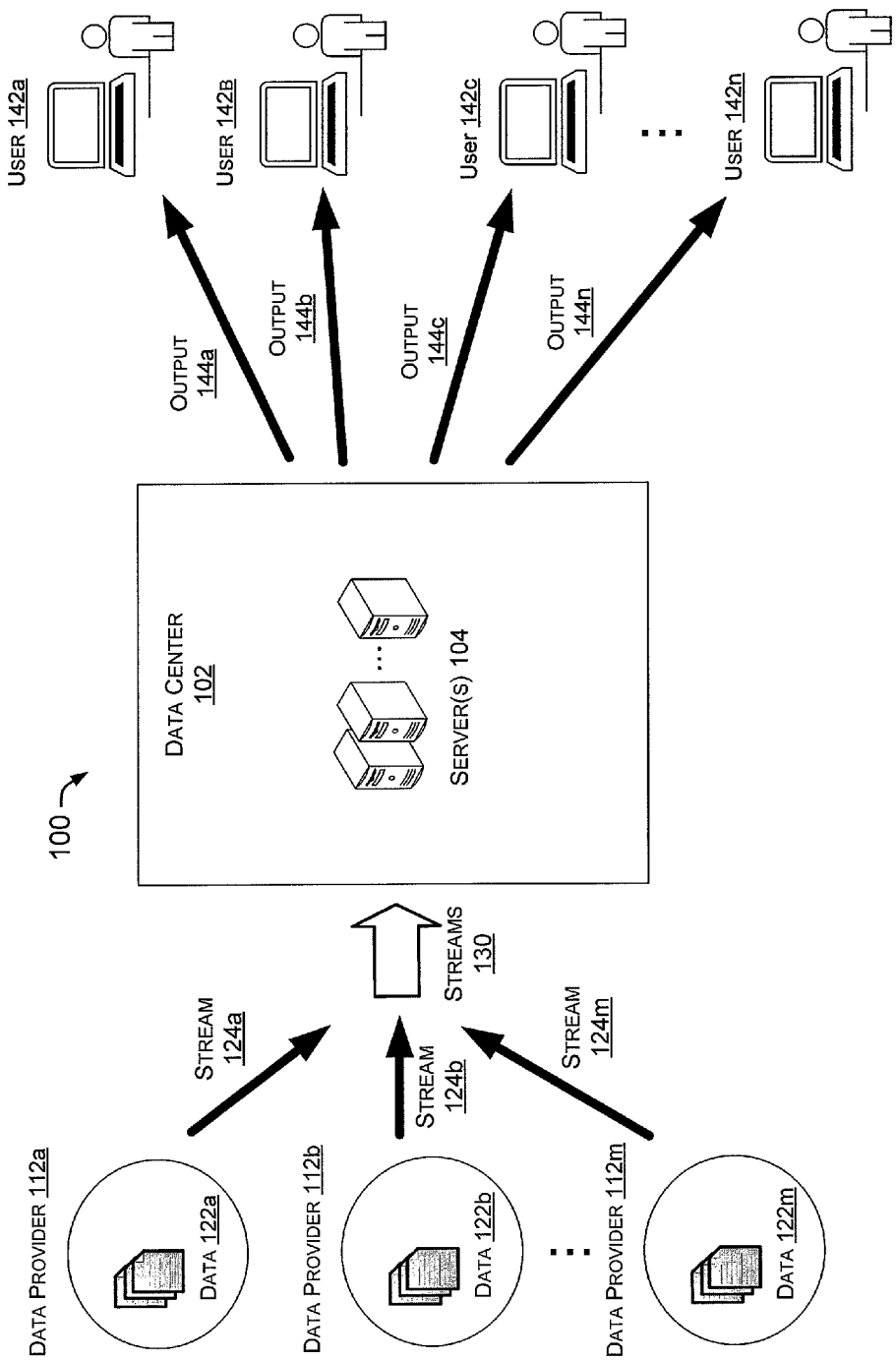
FIG. 1 shows an example scheme in which aggregation of string matching with respect to multiple data streams may be implemented, arranged in accordance with at least some of the embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Many algorithms tend to scale better than linearly in number of terms searched, and there are likely multiple users screening the same text input (e.g., social media feeds, stock prices, etc.) such that the total number of searches may be reduced as well. The output of these searches could be produced with fewer resources when a single search task is processing the terms of many users. Data centers would also benefit from joining together users who are searching the same streams by reducing the amount of data flowing into and around their networks, and potentially by directing access to hardware that is designed for string matching. Customers using the same streams may even be on the same "user" account in the data center. For example, some corporate entities may have multiple users or departments parsing the same internally generated data streams. Anything that data centers can do to reduce the resource consumption of such analytics will generate significant value.

Centralizing such functions in a data center provides a number of benefits for the operator of the data center. First, multiple users within a data center may subscribe to the same feeds (e.g., Gnip's social streams, http://gnip.com/product_overview/), and reducing the feeds to one copy of each stream may save money and bandwidth for both the data center and the stream provider. Second, multipattern string matching scales very well with additional search terms. While single pattern search algorithms like Boyer-Moore scale linearly in resource demand with regard to search term count, multi-pattern methods like Aho-Corasick are sublinear with regard to search term count once the initial processing cost to construct the Aho-Corasick tree is paid so that additional terms cost less. Exact reports of Aho-Corasick scaling are highly variable due to the strong impact of coding and memory, but it is clear that replacing, e.g., twenty users doing Aho-Corasick search with one unit doing the same search work would reduce processing requirements by five to ten times, with additional gains made by removing duplicate search terms and streams.

The sublinear scaling of Aho-Corasick and multipattern matching means that it is better, regarding hardware resources, to add more patterns to a single matcher than it is to run multiple matchers. Thus, a data center may generate value from user aggregation by performing infrastructure string matching.

Another advantage is direct hardware access. Typically, data centers have a border/gateway function that includes network processors. These layers include session border controllers, border gateways, session aware load balancers, multiservice security gateways, or other similar equipment. These processors include matching engines for rapidly matching patterns in headers or packets themselves. The onset of software defined networks (SDN) means that such network functions are expected of general purpose server racks, which points toward a generation of mixed general purpose and network processing chips and mainstream chips that are already appearing and include general purpose processors and hardware finite automata (HFAs) which are specifically designed for Aho-Corasick matching. This further increases the potential value of infrastructure-owned multipattern string matching. Specifically, a data center implementing techniques of the present disclosure may likely not only reduce network usage by aggregating incoming streams across customers, but also have advantages of both algorithm scaling and hardware acceleration that are not readily available to datacenter users.

The example embodiments for infrastructure string matching described herein detect that multiple users are parsing the same streams, find ways to merge and aggregate them without losing data, and deliver the results to different users.

FIG. 1 shows an example scheme 100 in which aggregation of string matching with respect to multiple data streams may be implemented, arranged in accordance with at least some of the embodiments described herein. As depicted, scheme 100 includes, at least, data center 102, a set of data providers 112a-112m, and a set of users 142a-142n. Data center 102 includes one or more servers 104 configured to perform operations in accordance with various embodiments of the present disclosure.

Each of data providers 112a-112m is a respective source of data. For example, as shown in FIG. 1, data providers 112a-112m include repositories of data 122a-122m. Data providers 112a-112m are configured to provide data streams 124a-124m, respectively, to data center 102 upon requests made by one or more of users 142a-142n, e.g., via data center 102. Data center 102 receives some or all of the data streams 124a-124m as streams 130, and aggregates string matching with respect to streams 130 before routing some or all of outputs 144a-144n to some or all of users 142a-142n. In the present disclosure, users 142a-142n may refer to a set of computing devices and their respective human operators in that each computing device may be associated with and used by one or more human operators.

One or more processors of the one or more servers 104 of data center 102 may be configured to determine or otherwise identify one or more opportunities for aggregation of string matching with respect to streams 130, and to perform aggregation of string matching when at least one opportunity is determined or otherwise identified. In some embodiments, the one or more processors of the one or more servers 104 may be configured to function as an aggregation determination module 200 and a handoff management module 300 to implement aggregation of string matching with respect to streams 130 in accordance with the present disclosure.

Figure 2:
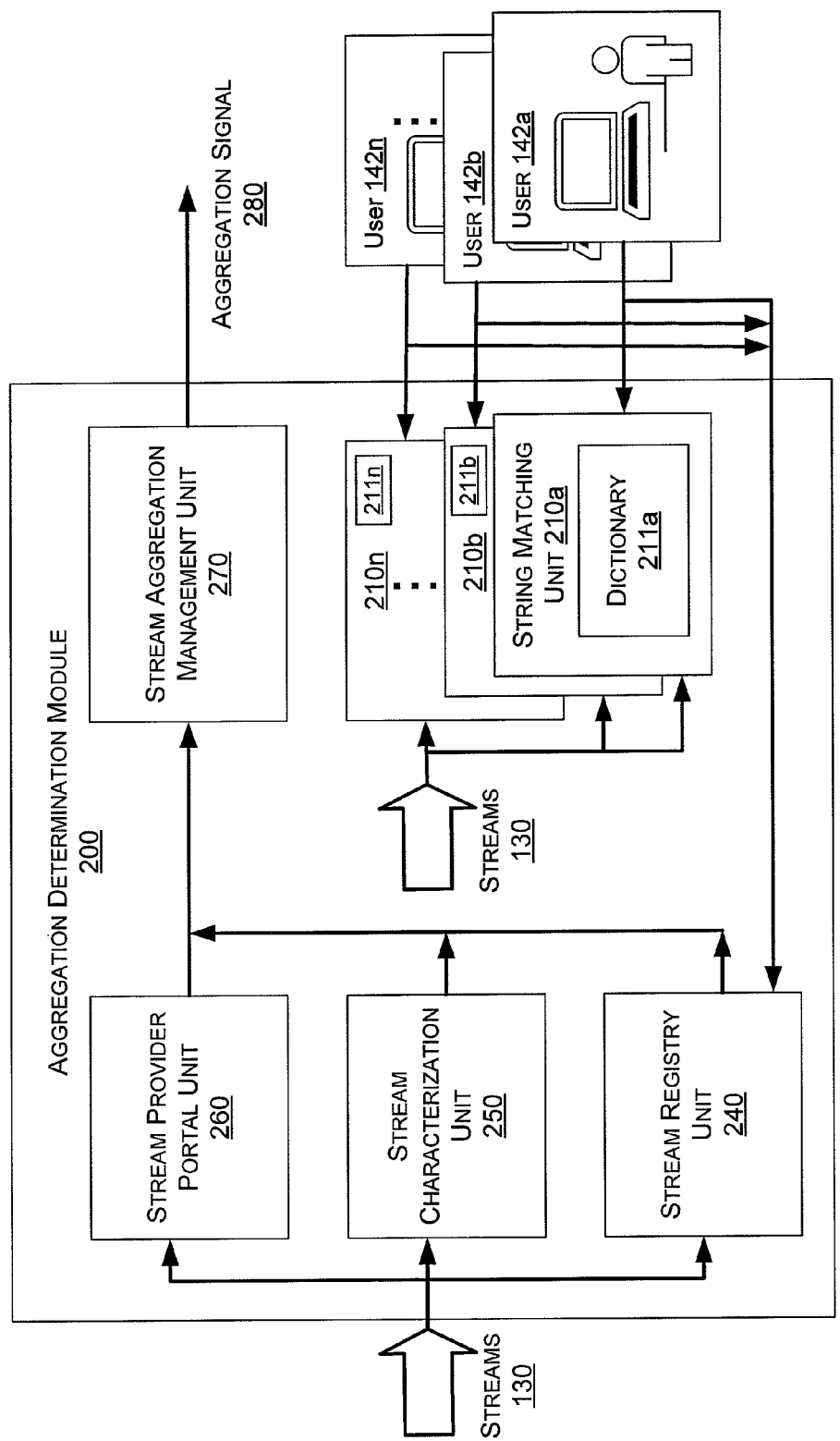
FIG. 2 shows an example scheme in which determination of stream aggregation may be implemented, arranged in accordance with at least some of the embodiments described herein.

FIG. 2 shows an example aggregation determination module 200 in accordance with at least some of the embodiments described herein. As depicted, aggregation determination module 200 includes a plurality of string matching units 210a-210n, stream registry unit 240, stream characterization unit 250, stream provider portal unit 260, and stream aggregation management unit 270. The purpose of aggregation determination module 200 is to detect and signal when multiple users of users 142a-142n have initiated string matching on the same stream.

String matching units 210a-210n include dictionaries 211a-211n, respectively. That is, each of string matching units 210a-210n includes a respective dictionary. String matching units 210a-210n may be configured to perform operations including: receiving string matching requests from some or all of users 142a-142n with respect to streams 130, performing string matching related to streams 130 in response to receiving the requests from some or all of users 142a-142n, and composing a combined dictionary from dictionaries 211a-211n each of which including a respective plurality of strings. Stream matching units 210*a*-210*n* may be set up by users 142*a*-142*n*, e.g., via an application programming interface (API) call.

Stream registry unit 240 may be configured to perform operations including: registering an identity of each data stream (e.g., 124*a*-124*m*) of streams 130 and generating a first output. In some embodiments, in registering the identity of a given data stream, stream registry unit 240 may store a source identity, an IP address, a service provider, or another identifier associated with the given data stream.

Stream characterization unit 250 may be configured to perform operations including: extracting information from each data stream of streams 130 and generating a second output. Stream characterization unit 250 may be flexible. Specifically, for example, in the strictest implementation, two data streams of streams 30 may have to be item-by-item identical before aggregation will occur. However, the gains from search aggregation may be significant. Other components of aggregation determination module 200 and handoff management module 300 may be capable of sorting out by association that a user may not qualify for search results from a given stream because they may not have received that particular item. Accordingly, in some cases it would make sense to aggregate streams that share 50% or less discrete items. In such a case, the items that are not to be delivered to a given user may be tagged such that a user only receives the results from items such user is entitled to receive. The savings from multiuser pattern matching are sufficient to offset loss in reduction in search computation on a fraction of a given stream.

Stream provider portal unit 260 may be configured to perform operations including: receiving indication from one or more data providers (e.g., data providers 112*a*-112*m*), that duplicate streams of data are provided to the one or more data providers, and generating a third output. Stream provider portal unit 260 may allow data providers 112*a*-112*m* to inform data center 102 of duplicate streams are being requested by one or more of users 142*a*-142*n* to be sent to the one or more users 142*a*-142*n*. In some embodiments, such information may be available in the form of multicast instructions. Each of data providers 112*a*-112*m* may provide data to stream provider portal unit 260, which identifies when multiple users (or multiple installations within a single user) have requested processing for the same stream. This in turn will trigger the sending of an aggregation signal 280, as described below.

Stream aggregation management unit 270 may be configured to receive the first output from stream registry unit 240, the second output from stream characterization unit 250, and the third output from stream provider portal unit 260. In response to receiving the first output, the second output, and the third output, stream aggregation management unit 270 may be further configured to identify a subset of requests of the string matching requests from some or all of users 142*a*-142*n* for processing of a given data stream to generate aggregation signal 280.

Figure 3:
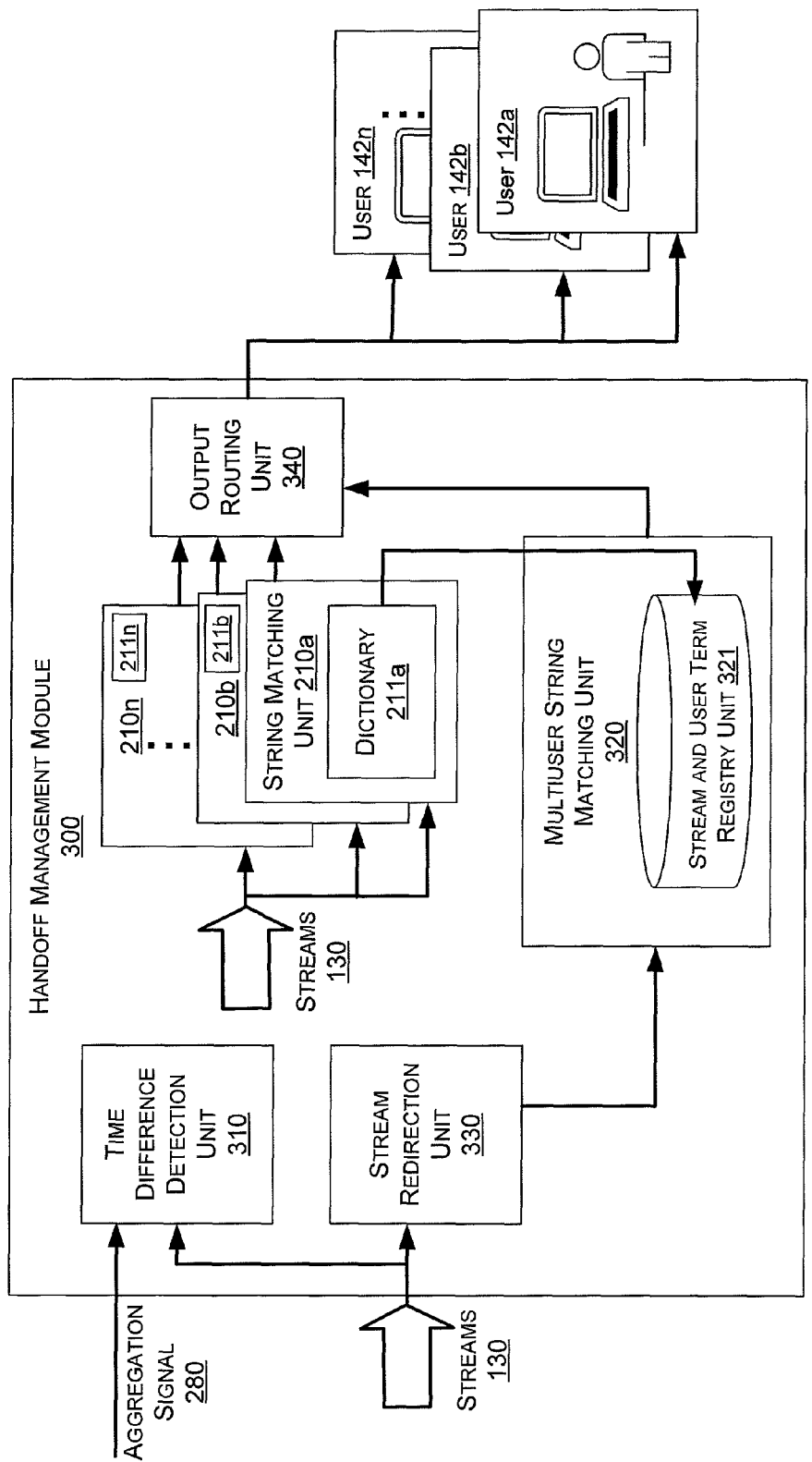
FIG. 3 shows an example scheme in which handoff management may be implemented, arranged in accordance with at least some of the embodiments described herein.

FIG. 3 shows an example handoff management module 300 in accordance with at least some of the embodiments described herein. Handoff management module 300 is configured for automatic aggregation of infrastructure string matching. As depicted, handoff management module 300 may include time difference detection unit 310, multiuser string matching unit 320, stream redirection unit 330, and output routing unit 340. Handoff management module 300 may share string matching units 210*a*-210*n* with aggregation determination module 200, and thus string matching units 210*a*-210*n* are also shown in FIG. 3.

Time difference detection unit 310 may be configured to perform operations including: receiving aggregation signal 280 and detecting a difference in time between at least two streams of the plurality of data streams. For example, aggregation signal 280 may identify matching feeds to time difference detection unit 310, which detects leads and/or lags between identical streams such as for different users of users 142*a*-142*n* who have subscribed to the same data service feed but might be receiving them through different connections. Those feeds may initially feed into some or all of single-user string matching units 210*a*-210*n*, which are individual user resources such as Storm bolts chosen from a data center library. Time difference detection may include observing the spacing between the occurrence of similar records on multiple input streams 130.

Stream redirection unit 330 may be configured to redirect a leading stream of streams 130 and to activate output routing for a given request of the subset of requests. Stream redirection unit 330 may also be configured to delay redirection of one or more next leading streams of streams 130 and activate output routing for associated one or more requests of the subset of requests. That is, stream redirection unit 330 may capture the incoming streams 130 and singulate streams 130, and may send a suppression message to the originator and/or add tags to the singulated stream such as to indicate which users are entitled to output from each record. The singulated stream is provided to multiuser string matching unit 320.

Multiuser string matching unit 320 may be configured to provide tagged results of string matching. The results are tagged so that each result is associate with a respective one of some or all of users 142*a*-142*n* that correspond to the subset of requests. In some embodiments, in providing the tagged results of string matching, multiuser string matching unit 320 may perform operations including: tagging each stream of streams 130 with identities of the multiple users among users 142*a*-142*n*, processing streams 130 to generate the results of string matching, and tagging the results of string matching to associate the results with the multiple users. In some embodiments, multiuser string matching unit 320 may process streams 130 by using one or more finite state automata and using the Aho-Corasick string matching algorithm.

Output routing unit 340 may be configured to route the tagged results of string matching from each data stream to some or all of users 142*a*-142*n*. Output routing unit 340 may be preserved and associated with a stream/user term registry so that the correct results are sent to the associated user (shown as the output from multiuser string matching unit 320 returning to output routing unit 140 in FIG. 3).

Handoff management module 300 may receive aggregation signal 280, detect lead or lag in the input streams 130, compose a combined dictionary, redirect the leading stream first while activating output to the first user of users 142*a*-142*n*, and delay redirection of streams in lead/lag order with activation of associated users until all the multiple users (who request for the same stream) among users 142*a*-142*n* are receiving results from the same stream. In some cases redirecting streams with a time difference may include tagging records a user may see multiple times due to switching leads and lags to prevent duplicate outputs or multiple counting of the same record. This may eliminate redundant network traffic while also joining string matching to take advantage of algorithmic complexity scaling.

Figure 4:
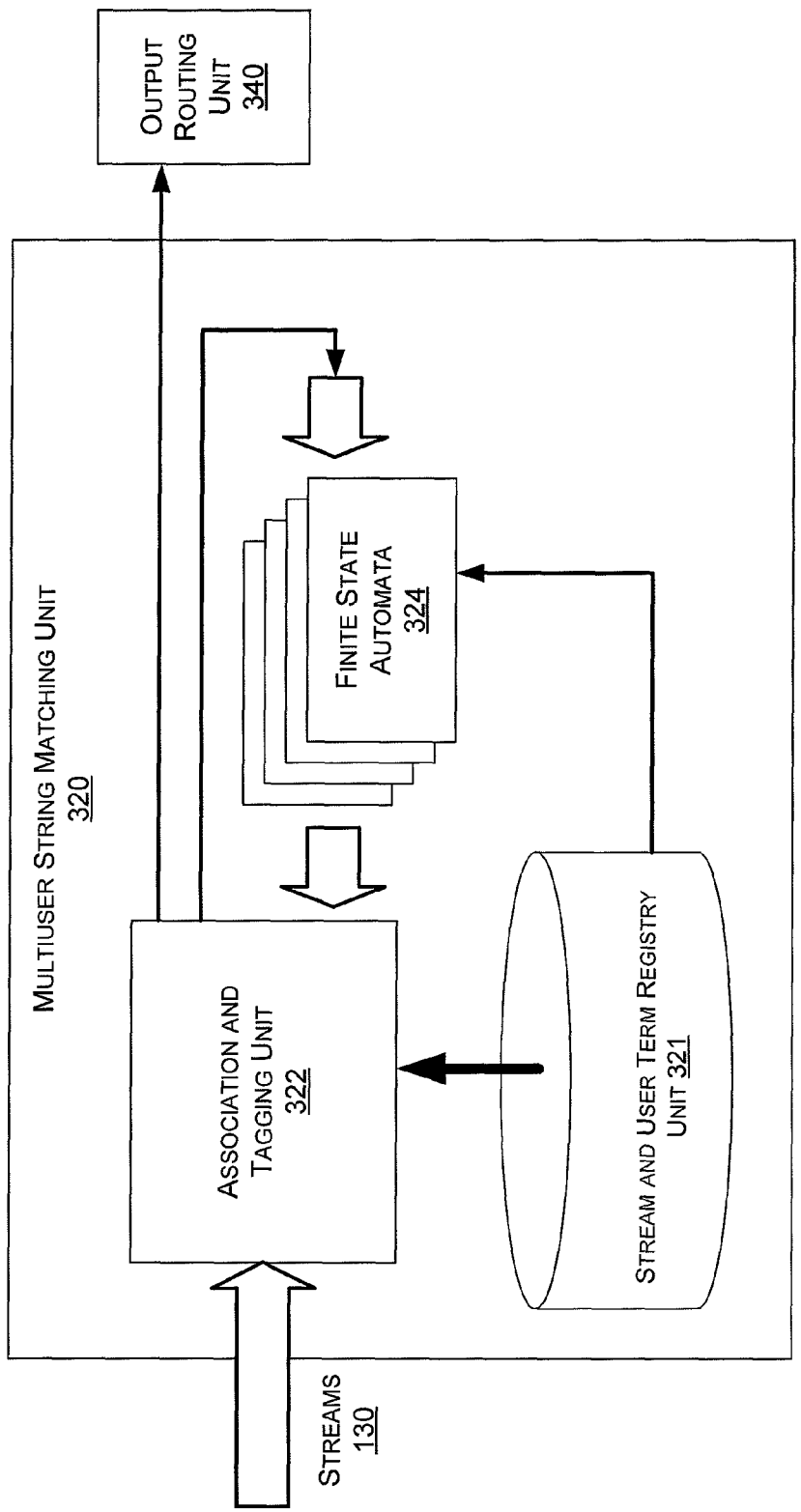
FIG. 4 shows an example scheme in which multiuser string matching may be implemented, arranged in accordance with at least some of the embodiments described herein.

FIG. 4 shows an example scheme in which multiuser string matching may be implemented, arranged in accordance with at least some of the embodiments described herein. As depicted, in some embodiments, multiuser string matching unit 320 includes stream and user term registry unit 321, association and tagging unit 322, and a plurality of finite state automata 324.

Stream and user term registry unit 321 may be configured to store a combined dictionary based on the dictionaries 211a-211n of string matching units 210a-210n.

Finite state automata 324 may be configured to process data streams 124a-124m of streams 130 to generate results of string matching. In some embodiments, finite state automata 324 process data streams using the Aho-Corasick string matching algorithm.

Association and tagging unit 322 may be configured to provide tagged or untagged results of string matching to associate each of the tagged or untagged results with a respective user among users 142a-142n corresponding to the requests therefrom. For example, association and tagging unit 322 may tag each stream of data streams 124a-124m with identities of some or all of users 142a-142n, finite state automata 324 may process data streams 124a-124m to generate the results of string matching, and association and tagging unit 322 may tag the results of string matching to associate the results with some or all of users 142a-142n who are entitled to receive the tagged results. The term registry may include associations of tags to each term.

As streams 130 are received by multiuser string matching unit 320, each string is associated at association and tagging unit 322 with the users and search terms, such as by tagging each stream with the identities of users observing that stream (e.g., from stream and user term registry unit 321). The unique terms for each stream are sent by stream and user term registry unit 321 to finite state automata 324 or other pattern recognition unit to process the streams 130 to generate results. At association and tagging unit 322, the results are tagged with the appropriate users to provide them to output routing unit 340, from which the tagged results may be sent selectively to the various users who originally set up processing of each target stream for each target term.

With reference to FIGS. 2-4, the aggregation that takes place at aggregation determination module 200 and handoff management module 300 takes multiple users and streams and discovers the converged combination of reduced streams and increased dictionaries to perform and redistribute all the relevant searches with fewer network and filtering resources. It is noteworthy that the actual string matching component (e.g., finite state automata 324 and dictionaries 211a-211n) are not particularly strongly altered in the present disclosure beyond the support for gathering and parceling out of multiple user needs.

A single user (e.g., data center account) may actually have multiple copies of a single stream that the present disclosure may reduce within a data center. For example, an e-commerce customer may generate a clickstream which is then subscribed to by separate marketing, product buying, and web analytics teams who may have different development teams that place filters in front of the stream. In such cases the reduction of duplicate streams and duplicate string processing presented herein may be within the same user account. The data center may choose to indicate such savings are available and encourage the customer to formalize it to achieve greater stability and reduce complexity or, alternatively, may simply realize the gains and increase margins using techniques provided by the present disclosure.

Figure 5:
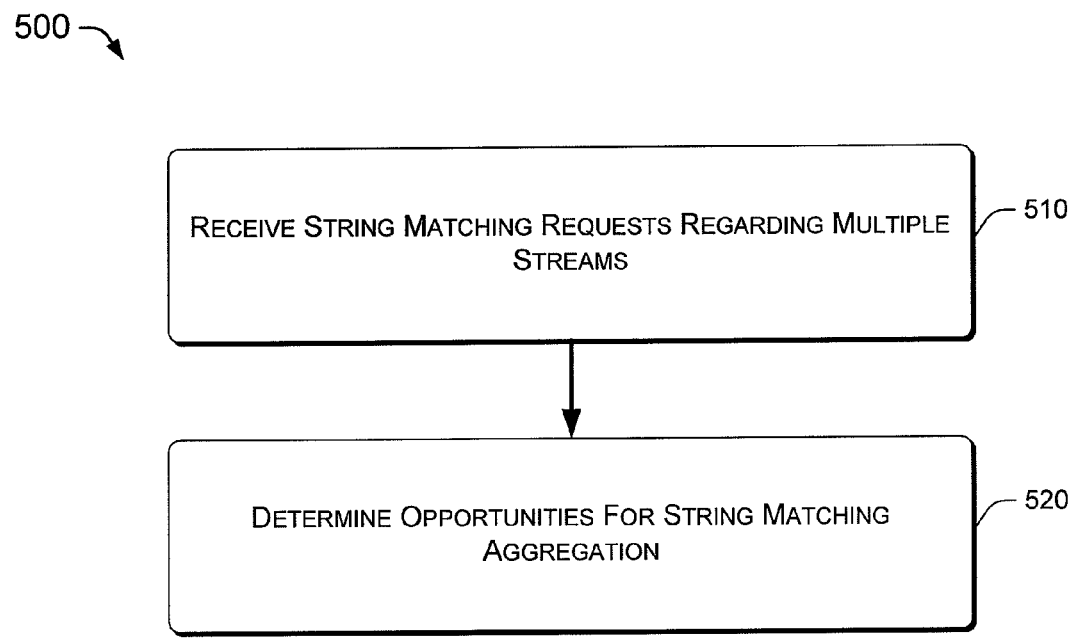
FIG. 5 shows an example processing flow with which aggregation of string matching with respect to multiple data streams may be implemented, arranged in accordance with at least some of the embodiments described herein.

FIG. 5 shows an example processing flow 500 with which aggregation of string matching with respect to multiple data streams may be implemented, arranged in accordance with at least some embodiments described herein. Processing flow 500 may be implemented by one or more processors of the one or more servers 104 of FIG. 1, aggregation determination module 200 of FIG. 2 in conjunction with handoff management module 300 of FIG. 3, or computing device 700 of FIG. 7. Further, processing flow 500 may include one or more operations, actions, or functions depicted by one or more blocks 510 and 520. Although illustrated as discrete blocks, various blocks may be divided into additional blocks, combined into fewer blocks, or eliminated, depending on the desired implementation. Processing flow 500 may begin at block 510.

Block 510 (Receive String Matching Requests Regarding Multiple Streams) may refer to one or more processors receiving a plurality of string matching requests with respect to a plurality of data streams. For example, one or more processors of the one or more servers 104, in which aggregation determination module 200 is implemented, may receive or observe multiple string matching request from multiple users of users 142a, 142b, . . . 142n with respect to data streams 124a-124n. Block 510 may be followed by block 520. String matching may, for example, be perceived in user deployments as the implementation of available string matching tools or may be received as explicit commands to set up datacenter string matching tools.

Block 520 (Determine Opportunities For String Matching Aggregation) may refer to the one or more processors determining one or more opportunities for aggregation of string matching. For example, one or more processors of the one or more servers 104, in which aggregation determination module 200 is implemented, may determine one or more opportunities for aggregation of string matching in accordance with the present disclosure.

In some embodiments, in determining the opportunities, processing flow 500 may include registering an identity of a first data stream of the plurality of data streams and providing a first output. For example, with reference to FIG. 1 and FIG. 2, stream registry unit 240 of aggregation determination module 200 may register an identity of the data stream 124a of streams 130 and provide a first output to stream aggregation management unit 270. In some embodiments, in registering the identity, processing flow 500 may store a source identity, an IP address, a service provider, or another identifier associated with the first data stream.

In some embodiments, in determining the opportunities, processing flow 500 may also include extracting information from the first data stream and providing a second output. Continuing with the above example, stream characterization unit 250 of aggregation determination module 200 may extract information from the data stream 124a and provide a second output to stream aggregation management unit 270.

In some embodiments, in determining the opportunities, processing flow 500 may further include receiving indication from one or more data providers that duplicate streams of data are provided to the one or more data providers, and providing a third output. Continuing with the above example, stream provider portal unit 260 of aggregation determination module 200 may receive indication from data providers 112a, 112b and 112c that duplicate streams of data are provided to one or more of users 142a-142n. In response to receiving such indication, stream provider portal unit 260 may provide a third output to stream aggregation management unit 270.

In some embodiments, processing flow 500 may also include identifying a subset of requests of the plurality of string matching requests for processing of the first data stream based on the first output, the second output, and the third output, and further include triggering aggregation of string matching for the subset of requests. Continuing with the above example, in response to receiving the first output, second output and third output, stream aggregation management unit 270 of aggregation determination module 200 may identify a subset of requests of the plurality of string matching requests for processing the data stream 124*a*. Upon the identification of the subset of requests, stream aggregation management unit 270 may trigger aggregation of string matching for the subset of requests by generating and providing an aggregation signal 280.

Additionally, processing flow may include aggregating string matching for the subset of requests in response to the triggering. For example, upon receiving the aggregation signal 280 from stream aggregation management unit 270 of aggregation determination module 200, handoff management module 300 may aggregate string matching for the subset of requests.

In some embodiments, in aggregating string matching, processing flow 500 may include detecting a difference in time between at least two streams of the plurality of data streams. Processing flow 500 may also include composing a combined dictionary from a plurality of dictionaries each of which including a respective plurality of strings. For example, time difference detection unit 310 of handoff management module 300 may detect difference in time, e.g., leads and/or lags, between identical streams such as for different users 142*a*-142*n* who have subscribed to data center 102 for the same data feed service but might be receiving the feeds through different connections and at different times. Additionally, string matching units 210*a*-210*n* or, alternatively, multiuser string matching unit 320 of handoff manager 300, may compose and store a combined dictionary in the stream and user term registry unit 321 based on the dictionaries 211*a*-211*n* of string matching units 210*a*-210*n*.

In some embodiments, in aggregating string matching, processing flow 500 may also include redirecting a leading stream of the plurality of data streams and activating output routing for a first request of the subset of requests. Processing flow 500 may further include delaying redirection of the one or more next leading streams in an order from leading to lagging in time with activation of output routing for the associated one or more requests until all the subset of requests are provided with results of string matching from the first data stream. For example, stream redirection unit 330 of handoff manager 300 may redirect a leading stream (e.g., data stream 124*a*) of streams 130 and activate output routing unit 340 of handoff manager 300 to route a first request of the subset of requests from users 142*a*-142*n*. Additionally, stream redirection unit 330 may delay redirection of one or more of data streams 124*b*-124*m* in an order from leading to lagging in time with activation of output routing of data streams 124*b*-124*m* for the associated one or more requests until all the subset of requests are provided with results of string matching from the data stream 124*a*.

In some embodiments, in aggregating string matching, processing flow 500 may further include providing tagged results of string matching that are tagged to associate each of the results with a respective one of multiple users that correspond to the subset of requests. Processing flow 500 may additionally include routing the tagged results of string matching from the first data stream to the multiple users. For example, the association and tagging unit 322 of multiuser string matching unit 320 may provide tagged results of string matching to associate each of the tagged results with a respective user among users 142*a*-142*n* corresponding to the requests therefrom. Additionally, output routing unit 340 may route the tagged results of string matching from data stream 124*a* to some or all of users 142*a*-142*n* who are entitled to receive data stream 124*a*.

In some embodiments, in providing the tagged results of string matching, processing flow 500 may include tagging each stream of the plurality of data streams with identities of the multiple users, processing the plurality of data streams to generate the results of string matching, and tagging the results of string matching to associate the results with the multiple users. For example, association and tagging unit 322 may tag each stream of data streams 124*a*-124*m* with identities of some or all of users 142*a*-142*n*, finite state automata 324 of multiuser string matching unit 320 may process data streams 124*a*-124*m* to generate the results of string matching, and association and tagging unit 322 may tag the results of string matching to associate the results with some or all of users 142*a*-142*n* who are entitled to receive the tagged results.

In some embodiments, in processing the data streams, processing flow 500 may process the data streams using the Aho-Corasick string matching algorithm. For example, the finite state automata 324 may implement the Aho-Corasick string matching algorithm in processing data streams 124*a*-124*m*.

Figure 6:
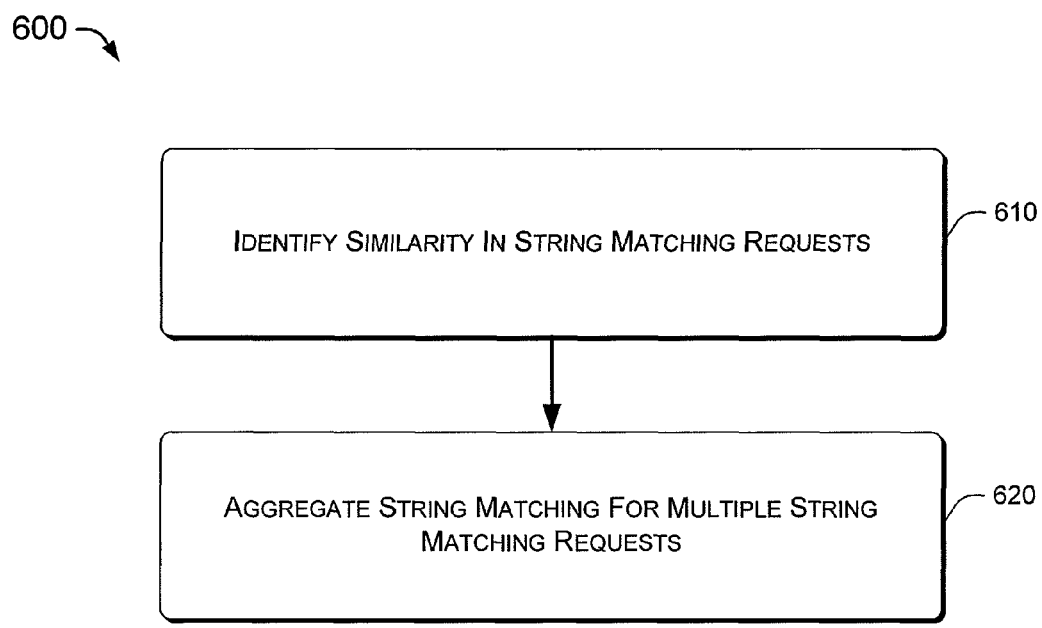
FIG. 6 shows another example processing flow with which aggregation of string matching with respect to multiple data streams may be implemented, arranged in accordance with at least some of the embodiments described herein.

FIG. 6 shows an example processing flow 600 with which aggregation of string matching with respect to multiple data streams may be implemented, arranged in accordance with at least some embodiments described herein. Processing flow 600 may be implemented by one or more processors of the one or more servers 104 of FIG. 1, aggregation determination module 200 of FIG. 2 in conjunction with handoff management module 300 of FIG. 3, or computing device 700 of FIG. 7. Further, processing flow 600 may include one or more operations, actions, or functions depicted by one or more blocks 610 and 620. Although illustrated as discrete blocks, various blocks may be divided into additional blocks, combined into fewer blocks, or eliminated, depending on the desired implementation. Processing flow 600 may begin at block 610.

Block 610 (Identify Similarity In String Matching Requests) may refer to one or more processors identifying similarity in a subset of requests of a plurality of string matching requests with respect to one or more data streams. For example, one or more processors of the one or more servers 104, in which aggregation determination module 200 is implemented, may identify similarity in a subset of, i.e., multiple, requests of a set of string matching requests with respect to one or more data streams 124*a*-124*m*. Block 610 may be followed by block 620.

Block 620 (Aggregate String Matching For Multiple String Matching Requests) may refer to the one or more processors aggregating string matching for the subset of requests of the plurality of string matching requests. For example, one or more processors of the one or more servers 104, in which aggregation determination module 200 is implemented, may aggregate string matching for the subset of requests when there is similarity in the subset of requests.

In some embodiments, in identifying similarity in the subset of requests, processing flow 600 may include characterizing the string matching requests and detecting opportunities for aggregation of string matching for the subset of requests. For example, with reference to FIG. 1 and FIG. 2, aggregation determination module 200 may be configured to characterize the string matching requests from users 142*a*-

142n and detect opportunities for aggregation of string matching for the subset of requests.

In some embodiments, in characterizing the string matching requests, processing flow 600 may include registering an identity of a first data stream of the plurality of data streams and providing a first output. For example, stream registry unit 240 of aggregation determination module 200 may register an identity of the data stream 124a of streams 130 and provide a first output to stream aggregation management unit 270. In some embodiments, in registering the identity, processing flow 600 may store a source identity, an IP address, a service provider, or another identifier associated with the first data stream.

In some embodiments, in characterizing the string matching requests, processing flow 600 may also include extracting information from the first data stream and providing a second output. Continuing with the above example, stream characterization unit 250 of aggregation determination module 200 may extract information from the data stream 124a and provide a second output to stream aggregation management unit 270.

In some embodiments, in characterizing the string matching requests, processing flow 600 may further include receiving indication from one or more data providers that duplicate streams of data are provided to the one or more data providers, and providing a third output. Continuing with the above example, stream provider portal unit 260 of aggregation determination module 200 may receive indication from data providers 112a, 112b and 112c that duplicate streams of data are provided to one or more of users 142a-142n. In response to receiving such indication, stream provider portal unit 260 may provide a third output to stream aggregation management unit 270.

In some embodiments, in detecting opportunities for aggregation, processing flow 600 may include identifying the subset of requests for processing of the first data stream based on the first output, the second output, and the third output. Continuing with the above example, in response to receiving the first output, second output and third output, stream aggregation management unit 270 of aggregation determination module 200 may identify a subset of requests of the plurality of string matching requests for processing the data stream 124a.

In some embodiments, in aggregating string matching, processing flow 600 may include managing combined dictionary composition and managing distribution of outputs for the plurality of string matching requests by adjusting for a difference in time in the one or more data streams. For example, handoff management module 300 may be configured to manage combined dictionary composition as well as manage distribution of outputs for the plurality of string matching requests by adjusting for a difference in time in the one or more data streams.

In some embodiments, in managing combined dictionary composition, processing flow 600 may include composing a combined dictionary from a plurality of dictionaries each of which including a respective plurality of strings. For example, string matching units 210a-210n or, alternatively, multiuser string matching unit 320 of handoff manager 300, may compose and store a combined dictionary in the stream and user term registry unit 321 based on the dictionaries 211a-211n of string matching units 210a-210n. The combined dictionary may include indications of which terms are associated with users, and terms may be associated with single or multiple users.

In some embodiments, in adjusting for a difference in time, processing flow 600 may include redirecting a leading stream of the one or more data streams and activating output routing for a first request of the subset of requests. Processing flow 600 may also include delaying redirection of the one or more next leading streams in an order from leading to lagging in time with activation of output routing for the associated one or more requests until all the subset of requests are provided with results of string matching from a first data stream of the one or more data streams. For example, stream redirection unit 330 of handoff manager 300 may redirect a leading stream (e.g., data stream 124a) of streams 130 and activate output routing unit 340 of handoff manager 300 to route a first request of the subset of requests from users 142a-142n. Additionally, stream redirection unit 330 may delay redirection of one or more of data streams 124b-124m in an order from leading to lagging in time with activation of output routing of data streams 124b-124m for the associated one or more requests until all the subset of requests are provided with results of string matching from the data stream 124a.

In some embodiments, in aggregating string matching, processing flow 600 may also include providing tagged results of string matching that are tagged to associate each of the results with a respective one of multiple users that correspond to the subset of requests. Processing flow 600 may further include routing the tagged results of string matching from the first data stream to the multiple users. For example, association and tagging unit 322 of multiuser string matching unit 320 may provide tagged results of string matching to associate each of the tagged results with a respective user among users 142a-142n corresponding to the requests therefrom. Additionally, output routing unit 340 may route the tagged results of string matching from data stream 124a to some or all of users 142a-142n who are entitled to receive data stream 124a.

In some embodiments, in providing the tagged results of string matching, processing flow 600 may include tagging each stream of the plurality of data streams with identities of the multiple users, processing the plurality of data streams to generate the results of string matching, and tagging the results of string matching to associate the results with the multiple users. For example, association and tagging unit 322 may tag each stream of data streams 124a-124m with identities of some or all of users 142a-142n, finite state automata 324 of multiuser string matching unit 320 may process data streams 124a-124m to generate the results of string matching, and association and tagging unit 322 may tag the results of string matching to associate the results with some or all of users 142a-142n who are entitled to receive the tagged results.

In some embodiments, in processing the data streams, processing flow 600 may process the data streams using the Aho-Corasick string matching algorithm. For example, the finite state automata 324 may implement the Aho-Corasick string matching algorithm in processing data streams 124a-124m.

Figure 7:
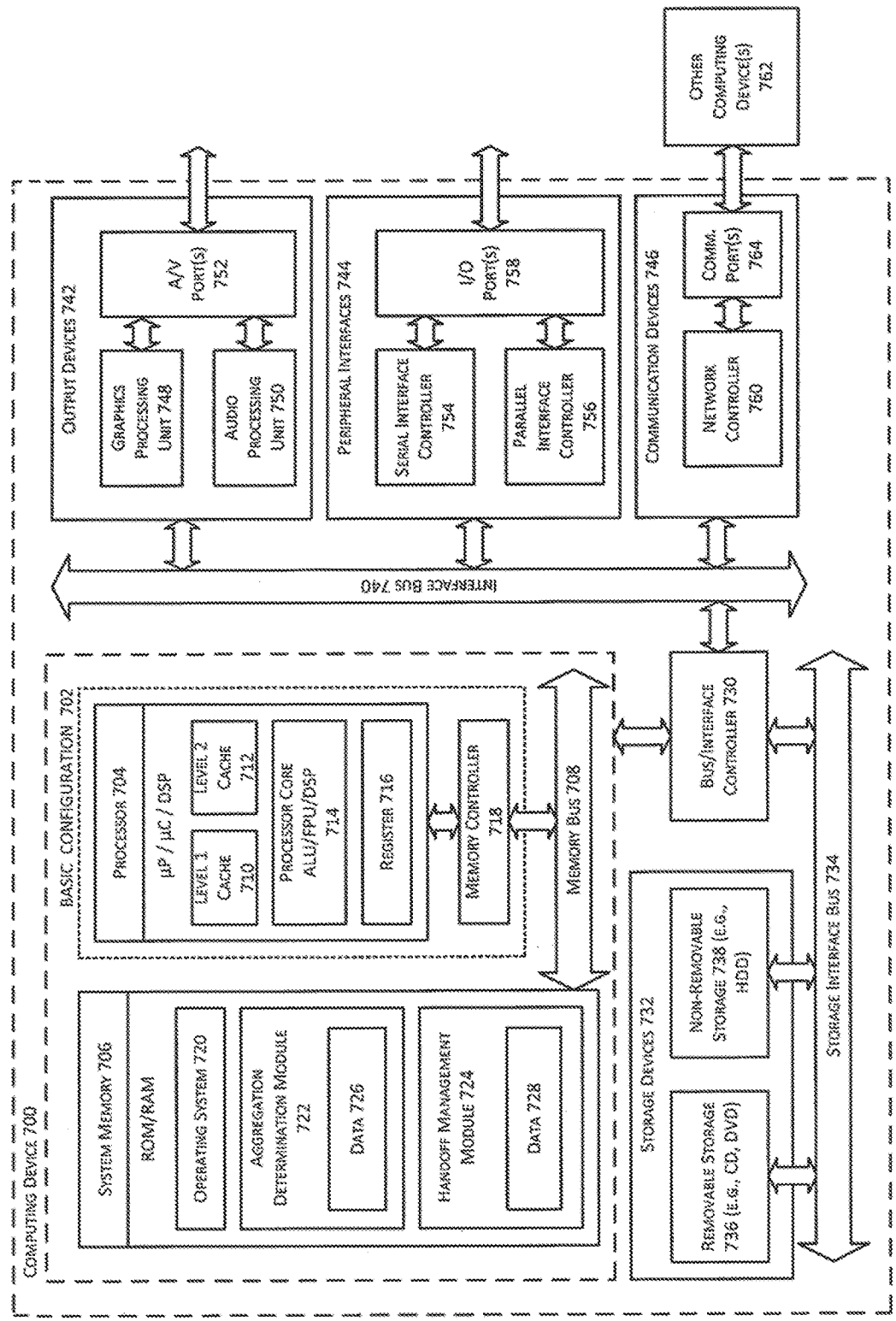
FIG. 7 shows a block diagram illustrating an example computing device by which various example solutions described herein may be implemented, arranged in accordance with at least some of the embodiments described herein.

FIG. 7 shows a block diagram illustrating an example computing device 700 by which various example solutions described herein may be implemented, arranged in accordance with at least some embodiments described herein.

In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (μP), a microcontroller (μC), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, aggregation determination module 722 and handoff management module 724. Aggregation determination module 722 may be similar to aggregation determination module 200 of FIG. 2, and perform functions as described herein with respect to FIG. 2. Handoff management module 724 may be similar to handoff management module 300 of FIG. 3, and perform functions as described herein with respect to FIG. 3. Aggregation determination module 722 includes data 726, which may be useful for operation of aggregation determination module 722. Similarly, handoff management module 724 includes data 728, which may be useful for operation of handoff management module 724. In some embodiments, aggregation determination module 722 may be arranged to operate with handoff management module 724, e.g., in conjunction with or on operating system 720, such that implementations of aggregation of string matching with respect to multiple data streams, e.g., processing flow 500 of FIG. 5 and processing flow 600 of FIG. 6, may be provided as described herein. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a smartphone, a personal data assistant (PDA), a personal media player device, a wireless web-watch device, a personal headset device, an application specific device, or a hybrid device that include any of the above functions. Computing device 700 may also be implemented as a server or a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for device configuration via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium, e.g., a fiber optic cable, a waveguide, a wired communications link, a wireless communication link, etc.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A method, comprising:
   receiving, by one or more processors, a plurality of string matching requests with respect to a plurality of data streams;
   determining, by the one or more processors, one or more opportunities for aggregation of string matching in the form of one or more subsets of requests of the plurality of string matching requests, the determining comprising:
      registering an identity of a first data stream of the plurality of data streams,
      extracting information from the first data stream,
      receiving indication from one or more data providers that duplicate streams of data are being requested from the one or more data providers, and
      identifying the one or more subsets of requests of the plurality of string matching requests for processing of the first data stream based on the registered identity, the extracted information, and the received indication; and
   aggregating string matching for the identified one or more subsets of requests, wherein the aggregating comprises:
      detecting a difference in time between at least two streams of the plurality of data streams,
      composing a combined dictionary from a plurality of dictionaries each of which including a respective plurality of strings,
      redirecting a leading stream of the plurality of data streams and activating output routing for a first request of the one or more subsets of requests, and
      delaying redirection of the one or more next leading streams in an order from leading to lagging in time with activation of output routing for the associated one or more requests until all the one or more subsets of requests are provided with results of string matching from the first data stream.

2. The method of claim 1, wherein the registering comprises storing a source identity, an IP address, a service provider, or another identifier associated with the first data stream.

3. The method of claim 1, wherein the aggregating further comprises:
   providing tagged results of string matching that are tagged to associate each of the results with a respective one of multiple users that correspond to the one or more subsets of requests; and
   routing the tagged results of string matching from the first data stream to the multiple users.

4. The method of claim 3, wherein the providing comprises:
   tagging each stream of the plurality of data streams with identities of the multiple users;
   processing the plurality of data streams to generate the results of string matching; and
   tagging the results of string matching to associate the results with the multiple users.

5. The method of claim 4, wherein the processing comprises processing using the Aho-Corasick string matching algorithm.

6. A non-transitory computer-readable storage medium having stored thereon computer-executable instructions executable by one or more processors to perform operations comprising:
   detecting opportunities for aggregation of string matching in the form of one or more subsets of requests of a plurality of string matching requests with respect to one or more data streams, the detecting comprising:
      characterizing the string matching requests by:
         registering an identity of a first data stream of the one or more data streams,
         extracting information from the first data stream,
         receiving indication from one or more data providers that duplicate streams of data are being requested from the one or more data providers, and
         identifying the one or more subsets of requests for processing of the first data stream based on the registered identity, the extracted information, and the received indication; and
   aggregating string matching for the identified one or more subsets of requests of the plurality of string matching requests, the aggregating comprising:
      managing combined dictionary composition by composing a combined dictionary from a plurality of dictionaries each of which including a respective plurality of strings, and
      managing distribution of outputs for the plurality of string matching requests by adjusting for a difference in time in the one or more data streams, wherein the adjusting comprises:
         redirecting a leading stream of the one or more data streams and activating output routing for a first request of the one or more subsets of requests, and
         delaying redirection of the one or more next leading streams in an order from leading to lagging in time with activation of output routing for the associated one or more requests until all the one or more subsets of requests are provided with results of string matching from a first data stream of the one or more data streams.

7. The non-transitory computer-readable storage medium of claim 6, wherein the registering comprises storing a source identity, an IP address, a service provider, or another identifier associated with the first data stream.

8. The non-transitory computer-readable storage medium of claim 6, wherein the aggregating further comprises:
   providing tagged results of string matching that are tagged to associate each of the results with a respective one of subset of users that correspond to the one or more subsets of requests; and
   routing the tagged results of string matching from the first data stream to the subset of users.

9. The non-transitory computer-readable storage medium of claim 8, wherein the providing comprises:
   tagging each stream of the one or more data streams with identities of the subset of users;
   processing the one or more data streams to generate the results of string matching; and
   tagging the results of string matching to associate the results with the subset of users.

10. The non-transitory computer-readable storage medium of claim 9, wherein the processing comprises processing using the Aho-Corasick string matching algorithm.

11. An apparatus, comprising:
an aggregation determination module, comprising:
- a plurality of string matching units configured to perform operations comprising:
  - receiving a plurality of string matching requests with respect to a plurality of data streams,
  - performing string matching related to the plurality of data streams in response to the receiving, and
  - composing a combined dictionary from a plurality of dictionaries each of which including a respective plurality of strings;
- a stream registry unit configured to perform operations comprising:
  - registering an identity of a first data stream of the plurality of data streams;
- a stream characterization unit configured to perform operations comprising:
  - extracting information from the first data stream;
- a stream provider portal unit configured to perform operations comprising:
  - receiving indication from one or more data providers that duplicate streams of data are being requested from the one or more data providers, wherein the aggregation determination module further comprises:
- a stream aggregation management unit configured to perform operations comprising:
  - receiving the registered identity, the extracted information, and the received indication,
  - identifying a subset of requests of the plurality of string matching requests for processing of the first data stream based on the registered identity, the extracted information, and the received indication, and
  - generating an aggregation signal; and
- a handoff management module, comprising:
  - a time difference detection unit configured to perform operations comprising:
    - receiving the aggregation signal, and
    - detecting a difference in time between at least two streams of the plurality of data streams; and
  - a stream redirection unit configured to perform operations comprising:
    - redirecting a leading stream of the plurality of data streams and activating output routing for a first request of the subset of requests, and
    - delaying redirection of one or more next leading streams of the plurality of data streams and activating output routing for associated one or more requests of the subset of requests.

12. The apparatus of claim 11, wherein the registering comprises storing a source identity, an IP address, a service provider, or another identifier associated with the first data stream.

13. The apparatus of claim 11,
wherein the handoff management module further comprises:
- a multiuser string matching unit configured to perform operations comprising:
  - providing tagged results of string matching that are tagged to associate each of the results with a respective one of multiple users that correspond to the subset of requests; and
- an output routing unit configured to perform operations comprising:
  - routing the tagged results of string matching from the first data stream to the multiple users.

14. The apparatus of claim 13, wherein the providing comprises:
- tagging each stream of the plurality of data streams with identities of the multiple users;
- processing the plurality of data streams to generate the results of string matching; and
- tagging the results of string matching to associate the results with the multiple users.

15. The apparatus of claim 14, wherein the processing comprises processing by a plurality of finite state automata.

16. The apparatus of claim 14, wherein the processing comprises processing using the Aho-Corasick string matching algorithm.

17. The apparatus of claim 11, wherein the aggregation signal identifies matching feeds to the time difference detection unit which detects lags between identical streams of the plurality of data streams for a plurality of users of a data center who have subscribed to a same data service feed and are receiving the data service feed through different connections.

* * * * *